United States Patent Office 3,637,821
Patented Jan. 25, 1972

3,637,821
PROCESS FOR THE PRODUCTION OF
SUBSTITUTED ACETIC ACIDS
Kaspar Bott, Marl, Germany, assignor to Chemische
Werke Huls A.G., Marl, Germany
No Drawing. Filed Aug. 11, 1966, Ser. No. 571,714
Claims priority, application Germany, Aug. 21, 1965,
P 15 18 668.2
Int. Cl. G07c 61/12
U.S. Cl. 260—514 B                    12 Claims

ABSTRACT OF THE DISCLOSURE

To produce substituted acetic acids vinylidene chloride is reacted in 80–90% sulfuric acid at —5 to +20° C. with a carbonium ion-forming compound, e.g. a tertiary alcohol, a secondary alcohol, sulfates, halogenides and esters of such alcohols. The reaction can also be conducted in the presence of a Friedel-krafts catalyst, such as boron trifluoride. The process facilitates production of complex acids, such as 3-methyl and 3,5-dimethyl adamantanyl-acetic acids.

---

This invention relates in general to the production of carboxylic acids and, more particularly, to a novel one-step process employing vinylidene chloride in the synthesis of substituted acetic acid.

It is known that alkyl-substituted acetic acids can be produced by the two-step process of first reacting an alkyl chloride with vinylidene chloride in a hydroxyl-free reaction medium with a Friedel-Crafts catalyst, and then hydrolyzing the reaction products with an acid. In the first step of this process, however, there are obtained, in addition to dichloro-olefins, the corresponding trichloro-alkanes which can be hydrolyzed to carboxylic acids only under vigorous conditions, i.e., with 90% sulfuric acid above 100° C. (see J. Am. Chem. Soc. 67, 1152 and 68, 1650; C.A. 40, 3768 [1946]). Consequently, it is necessary to employ in the hydrolysis step relatively high temperatures.

Not only does this conventional process require two separate reaction steps, the first of which utilizes a catalyst, but there are only small yields and the method is unsuitable for the synthesis of aryl-substituted acetic acids, such as β-phenylbutyric acid and diphenylpropionic acid.

It is therefore a principal object of this invention to provide an improved process for the production of both alkyl- and aryl-substituted acetic acids.

Another object of this invention is to provide in the production of substituted acetic acids an improved process in which there can be used a wide variety of starting materials.

These and other objects and advantages of the present invention will become apparent by reference to the following description and claims appended hereto.

It has been surprisingly discovered that substituted acetic acids can be produced in a one-step process under mild conditions by reacting 1 to 5 mols of vinylidene chloride with one mol of a carbonium ion-forming compound in 80–90% sulfuric acid at —5 to +20, preferably 0 to 15° C.

By carbonium ion-forming compounds are meant alcohols, esters of inorganic and organic acids, and the basic olefins which in solution form carbonium ions whose spatial structure is relatively unobstructed and which have a degree of instability such that an addition thereto can occur. The carbonium ion-forming tertiary alcohols which are particularly suitable are those having the following formula:

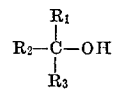

wherein $R_1$ and $R_2$ each represent alkyl of 1 to 6, preferably 1 to 2 carbon atoms or an alicyclic, preferably cycloalkyl of 5 to 10, preferably 5 to 6 carbon atoms;

$R_3$ represents alkyl of 1 to 6, preferably 1 to 2 carbon atoms, or $R_1$, $R_2$, and $R_3$ together represent a tricyclic adamantane structure.

Among the above carbonium ion-forming compounds, it is preferred to employ tertiary alcohols, such as t-butanol, 1,1 - dimethyl-pentanol-(1), 1-methyl-cyclohexanol, 1-methyl-cyclopentanol, 1,1-dimethyl-ethanol, 1-adamantol, 3-methyl-adamantol-(1), and 3,5-dimethyl-adamantol-(1).

Suitable carbonium ion-forming secondary alcohols are of the following formula:

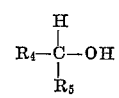

wherein $R_4$ and $R_5$ each represent a phenyl residue;

$R_5$ can also represent methyl; or $R_4$ and $R_5$ together represent an alicyclic ring system of 5 to 10, preferably 5 to 6 carbon atoms, or a bornyl residue.

From these carbonium ion-forming secondary alcohols or the olefins from which they are derived, it is preferred to employ benzohydrol, methylphenyl carbinol, norbornene, norborneol, methyl - norbornene, methyl - norborneol, cyclopentanol, cyclohexanol.

Furthermore suitable are the esters of aliphatic carboxylic acids having 1 to 4 carbon atoms, the sulfates or halogenides, such as bromides or chlorides of the corresponding alcohols. Exemplary of these compounds which can be advantageously used are benzhydryl chloride, benzhydryl bromide, benzhydryl formiate, benzhydryl acetate, benzhydryl propionate, benzhydryl butyrate, methylphenyl chloride, methylphenyl bromide, methylphenyl formiate, methylphenyl acetate, methylphenyl propionate, methylphenyl butyrate, norbornyl chloride, norbornyl bromide, norbornyl formiate, norbornyl acetate, norbornyl propionate, norbornyl butyrate, norbornyl sulfate, 1-chloroadamantane, 1 - bromoadamantane, adamantyl acetate - (1), adamantyl formiate - (1), adamantyl propionate-(1), adamantyl butyrate-(1), 1 - methyl - 3 - chloroadamantane, 1-methyl - 3 - bromoadamantane, 1-methyladamantyl - (3) - formiate, 1-methyladamantyl-(3)-acetate, 1 - methyladamantyl - (3)-propionate, 1 - methyladamantyl - (3) - butyrate, tert.-butylchloride, tert.-butyl bromide, tert.-butyl formate, tert.-butyl acetate, tert.-butyl propionate, tert.-butyl buyrate. Also suitable for use in the present process are olefins derived from the said carbinols. Such olefins include isobutylene, methylcyclohexene, methylcyclopentene, norbornene, methylnorbornene, cyclopentene, cyclohexene.

In the class of tertiary alcohols and the esters thereof suitable for use in the present invention, t-butanol and t-butyl chloride are the most reactive with vinylidene chloride to form t-butylacetic acid. When the above-described carbonium ion-forming compounds are utilized in the present process, the yield of the desired substituted acetic acid ranges between 70 and 78%. Quite unexpectedly, the reactivity of the 1 - bromo - adamantane makes possible the production of 1-adamantanyl-acetic acid with relative ease. However, the high molecular weight acyclic or cyclic carbinols, such as diethylmethyl carbinol or 1-methylcyclohexanol, can be converted into the corresponding carboxylic acids only in yields of up to 15%, the carboxylic acid synthesis failing completely in case of triphenyl carbinol and cumyl alcohol.

The substituted acetic acids which can be produced according to the present process include t-butylacetic acid, adamantanyl-acetic acid, 1-methylcyclohexyl-acetic acid, $\beta,\beta$ - methylcyclopentylacetic acid, $\beta,\beta$ - dimethylvaleric acid, $\beta,\beta$ - dimethyl - caprylic acid, $\beta$ - methyl - $\beta$ - ethylvaleric acid, $\beta$ - phenylbutyric acid, $\beta$ - phenylhydrocinnamic acid, norbornylacetic acid, methylnorbornylacetic acid, $\beta$ - phenylvaleric acid, cyclopentylacetic acid, and as novel compounds 3 - methyladamantanyl-acetic acid, 3,5-dimethyladamantanyl-acetic acid.

In carrying out the process of this invention, it is preferred to first mix the vinylidene chloride with the carbonium ion-forming compound and then slowly add the resultant mixture to a vessel containing 80–90% sulfuric acid maintained at from 0 to 15° C. If desired, the reaction can be conducted in the absence of a catalyst, but it has been found advantageous to utilize a Friedel-Crafts catalyst, and particularly boron trifluoride, in an amount of from 5 to 10%, preferably 6 to 8%, by weight, of the reaction mixture.

After from 2 to 5 hours, the reaction is terminated, and the reaction product worked up in the conventional manner.

For obtaining good yields it is necessary to use vinylidene chloride in an amount in excess of carbonium ion-forming compound, the molar proportions of the reactants being dependent on the individual carbonium ion-forming compound.

E.g. using benzohydrol or methylphenyl carbinol as the carbonium ion-forming compound a molar ratio of vinylidene chloride to the carbinol of 2.5:1 to 3:1 is advantageous, but reacting the said derivatives of adamantane, 3 to 4 mols of vinylidene chloride are used per mol of the carbonium ion-forming compound. In all the other cases a molar ratio of vinylidene chloride to the carbonium ion-forming compound of 1.5:1 to 2:1 is sufficient.

The amount of sulfuric acid used per mol of carbonium ion-forming compound should be at least 500 ml., preferably 800 to 1000 ml.

By utilization of the present process, it was unexpectedly found that aryl-substituted carboxylic acids, such as $\beta$-phenylbutyric acid and $\beta$-phenylhydrocinnamic acid can be produced under mild reaction conditions. With the present process, it is no longer necessary to react with the vinylidene chloride only an alkyl chloride, but now alcohols and even olefins can be employed in place of the chloride.

The substituted acetic acids obtainable by the process of the present invention are valuable starting materials in the syntheses of pharmaceutical products, as well as in the aromatics industry. These compounds find direct use as plasticizers, additives to tanning lyes, mordants, and vulcanization agents, and as oxidation catalysts in the form of their cobalt and manganese salts.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

In this example, conducted with a catalyst, two runs were made as follows:

(a) A mixture of 92.5 g. (1 mol) t-butyl chloride and 97 g. (1 mol) vinylidene chloride is added dropwise over a period of 2 hours and while stirring to 200 cc. of 90% sulfuric acid, the temperature of the reaction mixture being maintained at 0–5° C. Thereafter, the reaction temperature is allowed to rise to 10–20° C. and the reaction continued for 4 additional hours. The evolving hydrogen chloride carrying entrained reactants is conducted through a trap cooled to −80° C., there being collected in the trap after the reaction is terminated from 42 to 45 g. of an almost equimolar mixture of vinylidene chloride and t-butyl chloride. The reaction mixture is worked up by pouring into ice water, shaking out with ether, and fractionation at 80–82° C. (13 mm. Hg) in a 50 cc. packed column. There are produced 64 g. t-butylacetic acid (70% yield).

(b) In this run, in place of t-butyl chloride, 116 g. t-butylacetate are employed as the carbonium ion-forming compound, the other reaction conditions being the same as in (a). There are obtained 61 g. t-butylacetic acid (67% yield).

EXAMPLE 2

A slurry of 92 g. (0.5 mol) benzohydrol and 97 g. (1 mol) vinylidene chloride are reacted in 200 cc. 90% sulfuric acid according to the method in Example 1. The product obtained when ice water is mixed with the reaction solution is treated with a hot dilute solution of sodium hydroxide, and the resultant alkaline solution is then acidified. There are obtained 80 g. $\beta$-phenylhydrocinnamic acid. Yield: 71%; M.P. 148–153° C.

EXAMPLE 3

Into 200 cc. 90% sulfuric acid is charged a mixture of 122 g. (1 mol) phenylmethyl carbinol and 291 g. (3 mols) vinylidene chloride, the reaction then being conducted as in Example 1. After termination of the reaction, there are recovered from the cooling trap 88–90 g. vinylidene chloride. The liquid reaction product is taken up in ether, the ether evaporated, and the carboxylic acids are dissolved, in a warm dilute sodium hydroxide solution. Upon distilling in a 20 cc. column the carboxylic acid fraction obtained by acidification there are obtained 82 g. methylhydrocinnamic acid (50% yield, B.P. 1 mm. Hg =112–113° C.) and 25 g. higher boiling residue in the flask.

EXAMPLE 4

A solution of 20 g. bromo-adamantane (0.094 mol) in 45 g. vinylidene chloride (0.48 mol) are added dropwise, over a period of 1 hour, to 80 ml. 90% sulfuric acid containing 14 g. boron trifluoride, the reaction mass being maintained at 5° C. After standing for an additional 3 hours at 5 to 10° C., the reaction is terminated. The reaction mixture is then poured into ice water to precipitate the crude adamantanylacetic acid which is then purified by dissolving in 10% sodium hydroxide solution and acidification of the filtered salt solution with dilute sulfuric acid. Yield: 12.5 g. (70%); M.P. 134–136° C.

EXAMPLE 5

A mixture of 94 g. norbornene (1 mol) and 194 g. vinylidene chloride (2 mols) is reacted, over a period of 4 hours, at 15° C. in 320 ml. 98% sulfuric acid to which 56 g. boron trifluoride have been added. The reaction mixture, after working up as in Example 1, yields 100 g. (65%) norbornylacetic acid. Boiling point 110–112° C./ 2 mm. Hg; $n_D^{20}$: 1.4820.

The preceding examples can be repeated with similar success by substituting the generically and specifically described reactants and operating conditions of this invention for those used in the preceding examples.

From the foregoing description, one skilled in the art can easily ascertain the essential characteristics of this in-

What is claimed is:

1. In a process for the production of an organo-substituted acetic acid, the step comprising reacting about 1–5 mols of a vinylidene chloride with one mol of a carbonium ion-forming compound in 80 to 90% sulfuric acid at −5 to +20° C., said carbonium ion-forming compound being selected from the group consisting of a compound of the formula

a compound of the formula

and an olefin of 4–8 carbon atoms, wherein $R_1$ and $R_2$ each represent alkyl of 1 to 2 carbon atoms or an alicyclic of 5 to 6 carbon atoms;

$R_3$ represents alkyl of 1 to 2 carbon atoms; or $R_1$, $R_2$, and $R_3$ together represent a tricyclic adamantane structure;

wherein $R_4$ and $R_5$ each represent a phenyl residue;

$R_5$ can also represent methyl; or $R_4$ and $R_5$ together represent an alicyclic of 5 to 6 carbon atoms, or a bornyl residue;

Z represents OH, alkanoyloxy of 1–4 carbon atoms, sulfonyloxy, Br or Cl.

2. The process as defined by claim 1 wherein the reaction is carried out in 80 to 90% sulfuric acid at from 0 to 15° C.

3. The process as defined by claim 1 wherein said carbonium ion-forming compound is a tertiary alcohol of the formula:

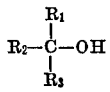

wherein $R_1$ and $R_2$ each represent alkyl of 1 to 2 carbon atoms or an alicyclic of 5 to 6 carbon atoms;

$R_3$ represents alkyl of 1 to 2 carbon atoms; or $R_1$, $R_2$, and $R_3$ together represent a tricyclic adamantane structure.

4. The process as defined by claim 1 wherein said carbonium ion-forming compound is a secondary alcohol of the formula:

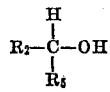

wherein $R_4$ and $R_5$ each represent a phenyl residue;

$R_5$ can also represent methyl; or $R_4$ and $R_5$ together represent an alicyclic of 5 to 6 carbon atoms, or a bornyl residue.

5. The process as defined by claim 1 wherein said carbonium ion-forming compound is selected from the group consisting of an ester of an aliphatic carboxylic acid of 1 to 4 carbon atoms, the sulfates or halogenides of the corresponding alcohol, and mixtures thereof.

6. The process as defined by claim 1 wherein said carbonium ion-forming compound is an olefin of 4 to 8 carbon atoms.

7. The process as defined by claim 1 wherein there are employed per mol of vinylidene chloride 0.2 to 1 mol of a carbonium ion-forming compound selected from the group consisting of benzhydryl acetate, benzhydryl chloride, methylphenyl bromide, methylphenyl propionate, norbornyl acetate, methylnorbornyl butyrate, norbornyl sulfate, 1-bromoadamantane, 1-methyl-3-bromoadamantane, 1-methyladamantyl-(3)-acetate, t-butyl chloride.

8. The process as defined by claim 1 wherein the reaction is conducted in the presence of a Friedel-Crafts catalyst.

9. The process as defined by claim 1 wherein said catalyst is boron trifluoride.

10. The process as defined by claim 1 wherein vinylidene chloride is employed in an amount in excess of said carbonium ion-forming compound.

11. The process as defined by claim 1 wherein about at least 500 ml. of sulfuric acid are used per gm. mol of carbonium ion-forming compound.

12. The process as defined by claim 10 wherein about at least 500 ml. of sulfuric acid are used per gm. mol of carbonium ion-forming compound.

References Cited

UNITED STATES PATENTS 2,398,430   4/1946   Joyce _____ 260—539

OTHER REFERENCES

Chem. Rev., vol. 64, pp. 287–289 (1964).
J.A.C.S. 68, 1650 (1946).
Annalen der Chem., vol. 618–251–266 (1958).
Angew. Chem., 71, 429 (1959).

LORRAINE A. WEINBERGER, Primary Examiner

P. J. KILLOS, Assistant Examiner

U.S. Cl. X.R.

260—413, 514 R, 515 R, 531 R, 533 R, 540

UNITED STATES PATENT OFFICE
CERTIFICATE OF CORRECTION

Patent No. 3,637,821      Dated January 25, 1972

Inventor(s) Kaspar Bott

It is certified that error appears in the above-identified patent and that said Letters Patent are hereby corrected as shown below:

In the Specification:

Col. 3, line 16, the first occurrence, "$\beta,\beta$" should be --- 1 ---;

In the Claims:

Claim 1, in the second formula, "R" should be ---H---;

Claim 4, in the formula, "$R_2$" should be ---$R_4$---.

Signed and sealed this 22nd day of August 1972.

(SEAL)
Attest:

EDWARD M. FLETCHER, JR.
Attesting Officer

ROBERT GOTTSCHALK
Commissioner of Patents